United States Patent [19]

Freyman

[11] Patent Number: 4,785,536
[45] Date of Patent: Nov. 22, 1988

[54] PLIERS-TYPE CUTTING HAND TOOL

[76] Inventor: Alexander Freyman, 1903 Ocean Ave. Apt. B-8, Brooklyn, N.Y. 11230

[21] Appl. No.: 57,788

[22] Filed: Jun. 4, 1987

[51] Int. Cl.$^4$ ............................................... B25F 3/00
[52] U.S. Cl. ............................................. 30/124; 30/92
[58] Field of Search ............. 30/92, 96, 166 R, 166 A, 30/124

[56] References Cited

U.S. PATENT DOCUMENTS 2,227,844  1/1941  Roche ................................ 30/124 X
2,608,748  9/1952  Kirkwood ............................ 30/124

FOREIGN PATENT DOCUMENTS 23410  1/1894  United Kingdom .................. 30/124

Primary Examiner—Paul A. Bell
Assistant Examiner—Michael D. Folkerts

[57] ABSTRACT

A pliers-type cutting hand tool utilizes a pair of elongated members pivotally connected adjacent their upper ends, the lower portions of said members form a pair of elongated handles. One of the members on its upper end is provided with a clamp, where an object may be secured, the other member carries a changeable saw blade, due to oscillating movement of which the cutting process is performed. The pivot connection of said members is capable of step-by-step movement towards the clamp, the constant engagement of the saw blade with the object being cut is thus provided.

5 Claims, 2 Drawing Sheets

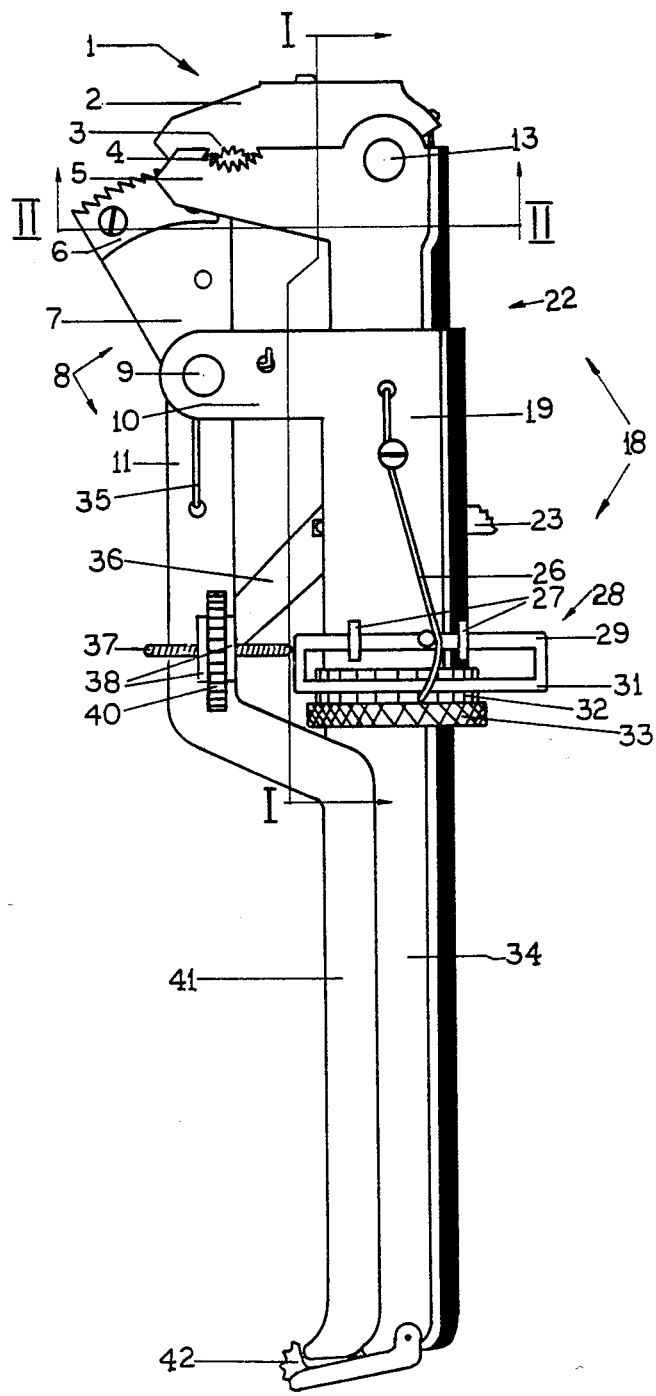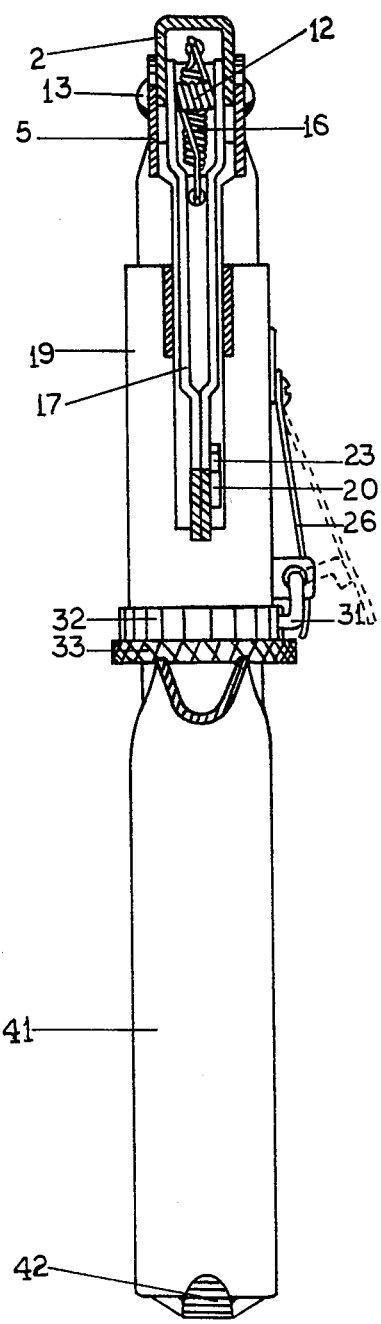
FIG. 1
FIG. 2

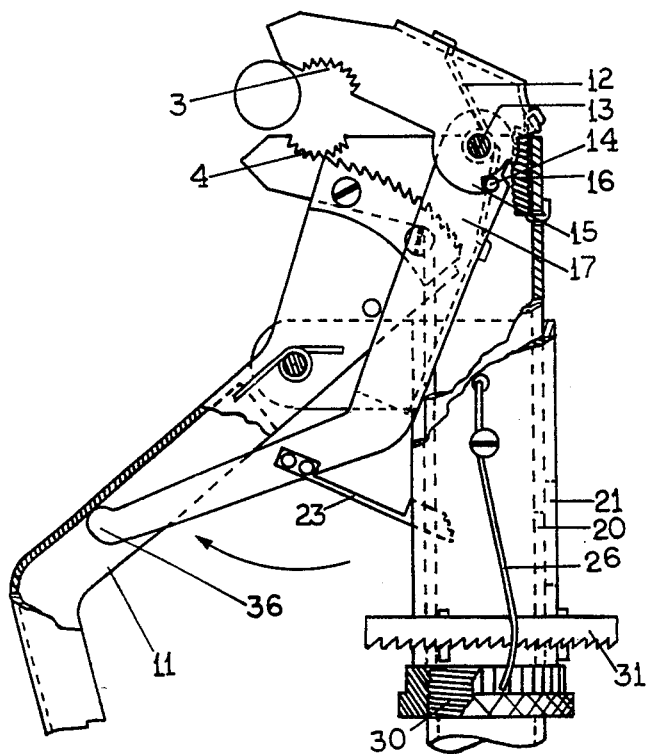
FIG. 3
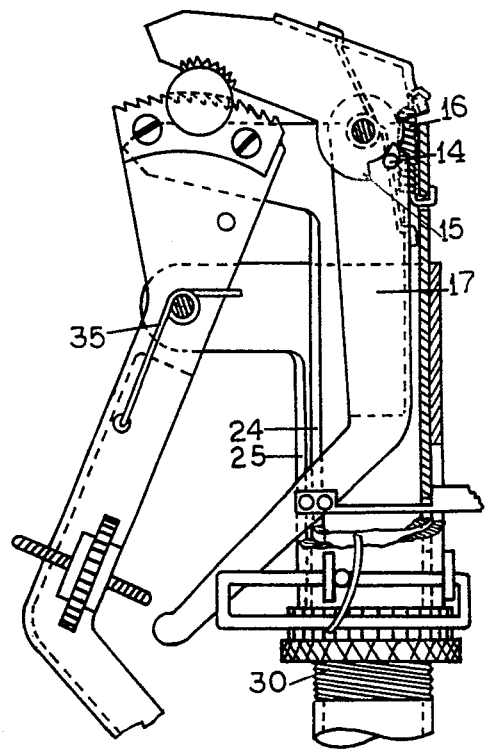
FIG. 4
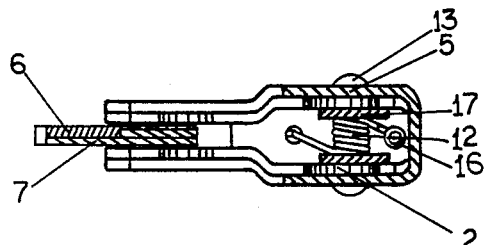
FIG. 5
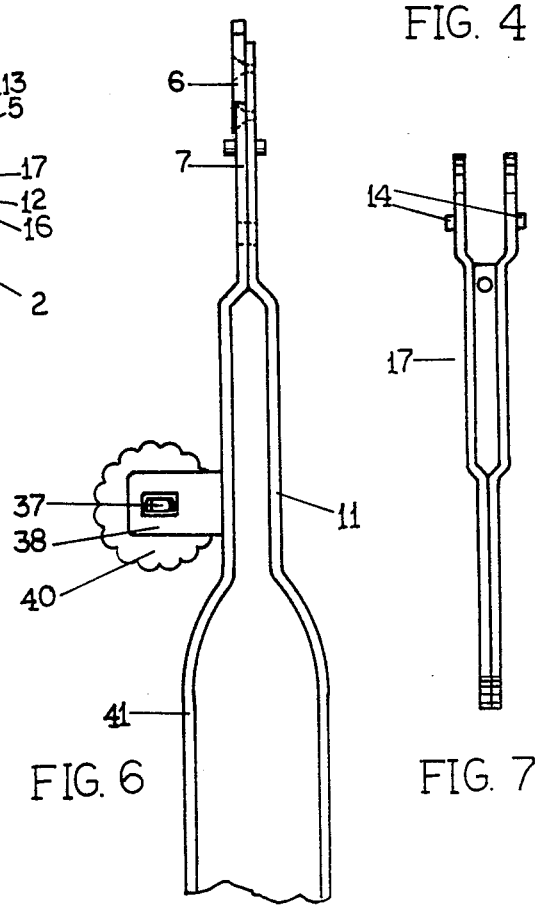
FIG. 6
FIG. 7

PLIERS-TYPE CUTTING HAND TOOL

BACKGROUND OF THE INVENTION

The present invention relates to pliers-type cutting hand tools. In conditional tools of this type a considerable amount of force is applied to the cutting jaws of the tool so that the pressure thus created enables the jaws to cut through the material. To provide this, the length of the handles is usually increased, or different devices, increasing the leverage of the handles are used. All this requires sturdy and extremely strong constructions of the cutting jaws and related parts. To avoid the above inconveniences a variety of sawing tools are used. But the sawing process usually requires space for the saw movement which is not always available, especially if the object being cut is a part of a complex machinery or mechanism. Besides, in order to be sawed, the object should be secured in a vise or otherwise made steady, which often requires dismounting it from the mechanism it belongs it.

The present invention provides a novel pliers-type cutting tool which enables to avoid these inconveniences. Rods or rod-shaped parts of mechanisms such as projecting pins, bolts ets., can be easily cut without separating them from the mechanisms they belong to and without using any additional securing appliances.

SUMMARY OF THE INVENTION

It is an object of the present invention to provide a pliers-type cutting tool which can be used for cutting rods and rod-shaped objects without applying a big amount of force to the cutting jaws and as a result with no need in increasing leverage of the handles and in use of sturdy constructions for cutting jaws and related parts.

Another object of the invention is to provide a pliers-type cutting tool which does not require applying a big pressure upon the object being cut, so that the object is never deformed by the cutting process, this advantage makes it possible to use said tool for cutting not only rods and rod-shaped objects, but also thin pipes and other hollow objects.

Still another object of the invention is to provide a convenient and reliable clamp for securing the materials being cut, said clamp is incorporated with the cutting tool and is controlled by means of the same pair of handles. This makes possible to cut parts of machinery such as bolts, pins, rods etc., withou separating them from the mechanisms they belong to and without securing them in a vise or other securing appliances.

These and other objects of the invention are attained by providing a pliers-type hand tool arrangement comprising a pivoting member with a saw blade on one end and an elongated handle on the other, said pivoting member is mounted on a bracket integral with a sleeve which is capable of moving up and down a shank, parallel to said pivoting member.

On one side of the shank, adjacent the saw blade, there is a clamp arrangement serving to secure the object being cut, the other side of the shank forms an elongated handle, convenient for operator's grip. The cutting process is performed by means of oscillating movement of a saw blade mounted on the pivoting member, said member is pulled one way by the operator's grip and the other way—by a return spring.

The constant engagement of the saw blade with the object being cut is provided by step-by-step vertical movement of the pivoting member carrying the saw blade, said pivoting member is mounted on a sleeve capable of sliding up and down the shank, and is put towards the clamp by a feeding mechanism comprising basically a pushing nut mounted on said shank and a ratchet-type mechanism used for rotating said nut.

The clamp comprises a pair of jaw-like members of which one is integral with the shank, and the other is actuated by the handle portion of the pivoting member through the means of a lever, said clamp is capable of being locked on an object due to a pawl arrangement.

These and other objects of the present invention will become apparent from the following detailed description and the accompanying drawings.

DESCRIPTION OF THE DRAWINGS

FIG. 1 is a side elevational view of a cutting hand tool embodying the present invention with the clamp in the closed position.

FIG. 2 is a sectional view taken on line I—I of FIG. 1.

FIG. 3 is a partial side elevational side of the cutting tool, parts broken away, showing the clamp in its open position and the rack disengaged from the ratchet wheel.

FIG. 4 is a partial side elevational view of the cutting tool, parts broken away, showing the clamp locked on an object and the cutting section in its working position.

FIG. 5 is a sectional view on line II—II of FIG. 1.

FIG. 6 is a partial front elevational view of the rocker.

FIG. 7 is a front elevational view of the lever.

DESCRIPTION OF THE PREFERRED EMBODIMENT

Referring to the drawings in particular, the invention embodied therein comprises a cutting pliers-type hand tool which includes basically a hollow tubelike shank 18, having a jaw 5, a pivot 13, a midsection 22, a threaded section 30 and an elongated handle 34.

Over the midsection 22 of said shank a sleeve 19 is slidably mounted, said sleeve rests on a pushing nut 33, which nut is mounted upon threaded section 30 of the shank 18. When rotated on the thread the pushing nut 33 goes up or down the shank 18, and, pushed by nut 33, so does the sleeve 19.

Integral with sleeve 19 is bracket 10 upon which bracket a rocker 8 is pivotally mounted on rocker pivot 9. On one side of the rocker pivot 9, adjacent the jaw 5, rocker 8 forms a segmental cutting section 7 with a changeable saw blade 6 mounted on it, on the other side of the pivot 9 there are formed elongated mid- and handle portions 11 and 41 respectively, said portions are bifurcated, as can be seen on FIGS. 3 and 6.

The upper jaw 2 is pivoted on clamp pivot pin 13 and together with lower jaw 5 forms a clamp generally designated 1. Both jaws 2 and 5 have serrated sections 3 and 4 respectively by means of which sections an object is normally secured. The upper jaw 2 through the means of spring 12 is resiliently engaged with lever 17, said lever is positioned longitudinally within the inner space of hollow shank 18 and pivoted on pin 13 by its upper portion, its lower portion is bent and passes through slots 24 and 25 of the shank 18 and sleeve 19 respectively, as can be seen on FIG. 4.

The resilient engagement of lever 17 and upper jaw 2 is provided by spring 12, said spring is wound round pivot pin 13, one end of said spring is engaged with upper jaw 2, the other—with lever 17 in such a way, that spring 12 keeps them normally at a constant angle due to a stop pin 14 resting against lug 15. This angle may be increased when an object is put into the clamp 1 (FIG. 4).

Lever 17 is normally locked in its backward position by a resilient pawl 23 attached to said lever and inserted through slots 20 and 21 of shank 18 and sleeve 19 respectively, said lever 17 through the means of spring 12 keeps the jaws 2 and 5 in the closed position, as can be seen on FIG. 4.

Latch 42 keeps rocker handle 41 together with and embracing shank handle portion 34 when the tool is not in use (FIG. 1). When pawl 23 and latch 42 are released, the rocker spring 35 pushes the lower part 11 of the rocker 8 outward in the direction shown by the arrow on FIG. 3, the bifurcated portion 11 of rocker 8 recedes away from the shank 18 and the end portion 36 of lever 17 follows it, due to the pull of the spring 16 lifting upper jaw 2 and thus opening clamp 1, and the resilient engagement of said upper jaw and lever 17, provided by spring 12 (FIG. 3). To close clamp 1 on an object the latter should be placed between the serrated portions 3 and 4 of the jaws 2 and 5, and the handle portions 34 and 41 pulled together. Rocker 8 engaged by its bifurcated portion 11 with the end portion 36 of lever 17 pushes said lever toward shank 18 thus through the means of spring 12 closing clamp 1 on an object, and when the upper jaw 2 cannot be moved any closer to the lower jaw 5, lever 17 still goes further into the inner space of the shank 18 making spring 12 give under pressure and increasing the angle between lever 17 and the upper jaw 2, thus tightening the grip on the object, until pawl 23 is caught in the slot 20 of shank 18 and lever 17 is locked in its backward position inside shank 18. Now the rocker 8 may be released for its oscillating movement on pivot 9 which is substantial for the cutting process, but the grip of the jaws on the object is still secured.

The cutting process is normally performed by means of oscillating movement of saw blade 6 mounted on cutting section 7 of rocker 8, said rocker pivots on pin 9. One way—away from the shank 18—the saw blade 6 moves as the handle 11 is pulled by the operator's grip, which is a cutting motion; the other way—towards the shank—which is a free motion, the rocker 8 is pulled by spring 35, mounted on pivot 9 and engaged with bracket 10 and rocker 8.

To keep the saw blade 6 in constant engagement with an object, the bracket 10 carrying rocker 8 moves step-by-step towards the clamp 1, said movement is provided through the means of feeding mechanism generally designated 28.

Feeding mechanism 28 basically comprises a pushing nut 33 integral with a ratchet wheel 32 and mounted on threaded section 30 of the shank 18, as shown of FIGS. 3 and 4, and a rack 31 integral with rod 29, said rod is mounted on brackets 27 in such a way that it is capable of sliding sideways in the apertures in said brackets. Brackets 27 are welded or otherwise fixedly attached to sleeve 19. Rack 31 is pressed by means of spring 26 with its teeth against the ratched wheel 32, and it will be noted that the teeth of the rack 31 are directed towards the rocker 8, as can be seen on FIG. 3, and the teeth of the ratchet wheel 32 are directed opposite, due to which arrangement rack 31 when moving towards the rocker 8 gets into engagement with the ratchet wheel 32, and moving in the opposite direction, i. e. away from the rocker, its teeth slip over the ratchet wheel 32, thus performing a free motion. Rack 31 is normally pushed towards the rocker 8 by means of spring 26, and away from the rocker—by the operator's grip through the means of adjusting screw 37, mounted on brackets 38, said brackets are fixedly attached to the midportion 11 of the rocker 8 (FIGS. 4 and 6).

Controlling nut 40 mounted on the adjusting screw 37 is positioned between brackets 38. When the operator's grip is released, and the handle portion 41 pushed by spring 35 goes away from the shank 18, the adjusting screw 37 recedes and rod 29 obtains freedom to move away from the shank 18 (left on FIG. 4), spring 26 mounted on sleeve 19 and engaged with rod 29 and rack 31 pushes rack 31 sideways towards the rocker 8. In its motion towards the rocker, rack 31 engages by its teeth with the ratchet wheel 32 and turns the ratchet wheel 32 and nut 33 integral with it on the threaded section 30 of shank 18. Being turned on thread, the pushing nut 33 goes one step upward and pushes sleeve 19 and the rocker 8 mounted on it, one step towards the clamp 1. The size of the step may be changed by the operator through the means of controlling nut 40. When controlling nut 40 is rotated, the adjusting screw 37, which is rectangular in crossection and placed in rectangular apertures of the brackets 38 (FIG. 6), moves sideways, towards or away from rack 31, thus changing the run of the rack 31 and, consequently, the angle of rotation of the pushing nut 33, which, in turn, changes the pitch of the vertical movement of sleeve 19. Turned upward round rod 29 (FIGS. 2 and 3), rack 31 can be easily disengaged from the ratchet wheel 32 and secured in this position by means of the spring 26. Now the pushing nut 33 can be turned manually for the vertical adjustment of the sleeve 19.

Between the pushing nut 33 and threaded surface 30 of the shank a plastic washer is placed, to create additional friction (not shown).

While a specific embodiment of the invention is shown and described, it will be readily apparent that many minor changes of structure and operation could be made without departing from the spirit of the invention.

What is claimed is:

1. A pliers-type cutting hand tool, comprising:
   a pair of pivotally connected elongated members, each having an upper, mid-, and lower portions respectively; one of said elongated members being stationary and provided with a clamp, positioned on the upper portion thereof, said clamp being used for securing an object being cut, the midportion of said stationary member being of elongated cylindrical shape and having a threaded section thereon, and the lower portion of said stationary member forming a stationary handle; the other of said elongated members being laterally movable and carrying a segmental saw blade positioned on the upper portion thereof, said blade being used for cutting an object secured in said clamp, the lower portion of said laterally movable member forming a movable handle positioned at a suitable distance from said stationary handle;
   a bracket carrying a pivot pin, whereupon said movable member is pivotally mounted;
   a sleeve, incorporated with said bracket and slidably disposed on the midportion of said stationary member;

a nut, supporting said sleeve and rotatably mounted on said threaded section, said nut, when rotated, being capable of moving translationally on said stationary member and imparting translational movement to said sleeve and said bracket towards and away from said clamp.

2. A pliers-type cutting hand tool according to claim 1, including a ratchet-wheel aligned and incorporated with said nut, and a pawl means engageable with said ratchet-wheel and oscillatory movable transversely to said stationary member, whereby rotation of said ratchet-wheel and said nut on said threaded section is provided.

3. A pliers-type cutting hand-tool, according to claim 1, wherein said translational movement of said sleeve and said bracket is used for providing constant engagement of said saw blade with an object secured in said clamp.

4. A pliers-type cutting hand tool, according to claim 1, wherein said nut has a plurality of notches disposed on an outer surface thereof, whereby said nut is adapted for being rotated manually.

5. A pliers-type cutting hand tool, according to claim 1, wherein said saw blade is changeable, so that if worn-out, said saw blade can be dismounted and replaced by a new one.

* * * * *